March 5, 1968     C. K. WILLIAMS     3,372,264
STOVE FOR SAUNA BATHS
Filed Jan. 27, 1967
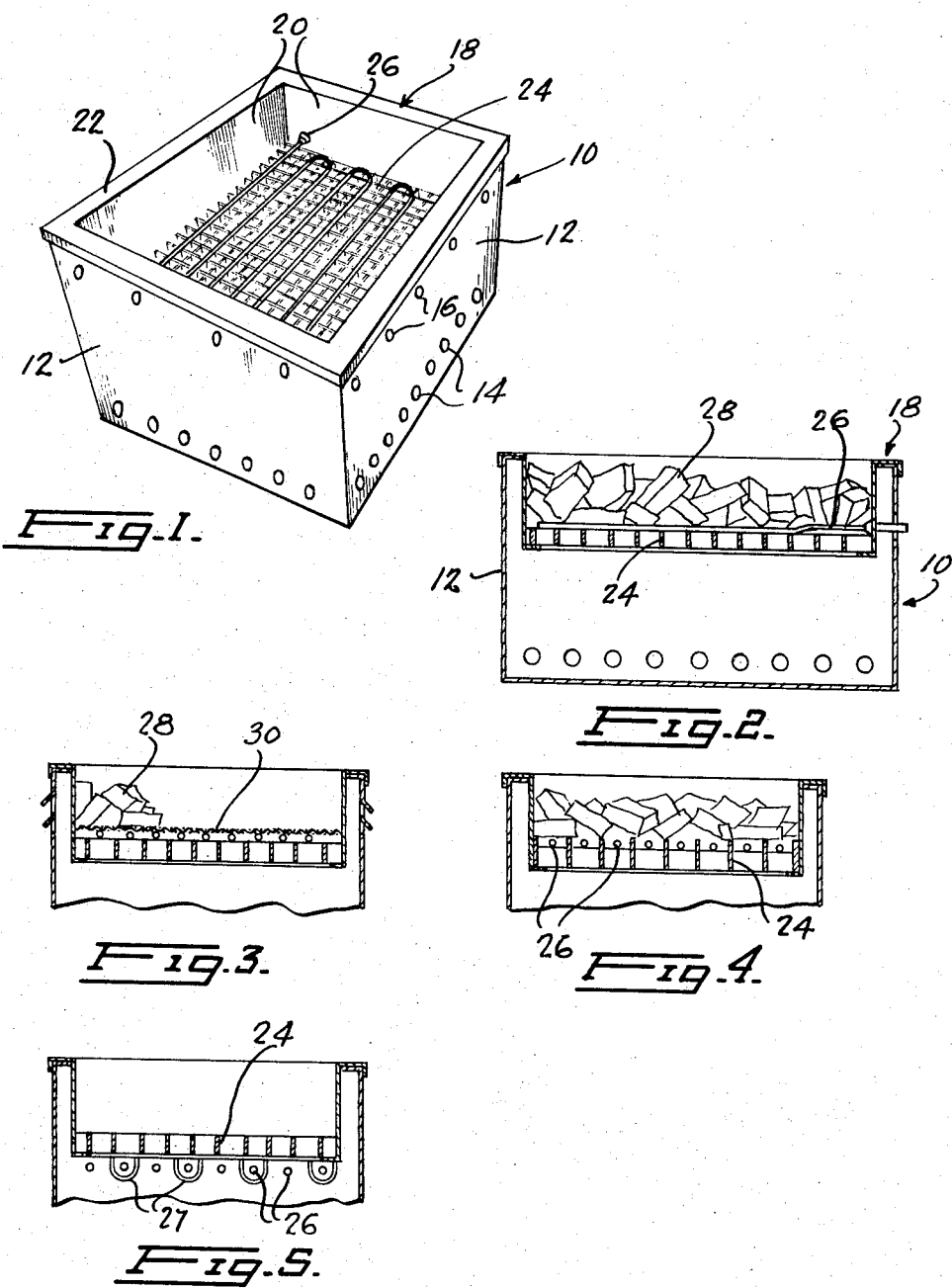

United States Patent Office 3,372,264
Patented Mar. 5, 1968

3,372,264
STOVE FOR SAUNA BATHS
Charles K. Williams, 475 Cambridge St.,
Ottawa 4, Ontario, Canada
Filed Jan. 27, 1967, Ser. No. 612,130
Claims priority, application Canada, Nov. 22, 1966,
976,104, Patent 764,585
2 Claims. (Cl. 219—367)

ABSTRACT OF THE DISCLOSURE

A sauna stove including an open-topped casing having in its upper portion an open-topped cage. The cage bottom comprises an open grid for supporting stones which are heated by electric heating elements mounted either immediately below the grid or positioned on the upper surface of the grid. In the latter arrangement, an expanded sheet metal heat distributor coextensive in area with the grid may be superposed on the heating elements. Alternatively, a plurality of strips projecting above the heating elements may be provided on the grid to prevent direct contact of the stove with the heating elements. The casing is provided with ventilating openings.

---

The present invention relates to a stove for sauna baths, particularly sauna baths of the type which will accommodate more than one person, simultaneously.

It is an object of this invention to provide a sauna bath of improved efficiency, which at the same time involves relatively low manufacturing cost.

A further object of the invention is to provide a sauna stove which has improved internal air circulation with a resultant improved heat dispersion potential.

A still further object of the invention is to provide a stove for use in a sauna bath comprising in combination a generally rectangular outer casing having four walls and a floor but an open top; an open-topped cage within said casing removably supported by said walls, said cage having a grid floor; at least one heating element adjacent said grid floor; and venting means in the walls of said casing at the tops and bottoms thereof.

These and other objects of the invention will become clear with reference to the following detailed description, which it will be understood is by way of example only, and the invention should not be limited thereby, except as defined in the appended claims.

In the accompanying drawings:

FIGURE 1 is a perspective view of a sauna stove according to the invention, without stones or rocks;

FIGURE 2 is a sectional view of the stove of FIGURE 1, including heating rocks; and, FIGURES 3, 4 and 5 are sectional views corresponding to that of FIGURE 2, showing modified forms of a stove platform and heating element.

Turning now to the drawings in detail, in FIGURE 1 a generally rectangular sauna stove is indicated at 10. Outer walls 12 include a plurality of air circulation holes 14 near the bottom thereof, and a further plurality of equally-spaced air circulation holes 16 near the upper edge of all four outer walls 12 of the stove 10. As an alternative to upper air circulation holes 16, louvers 17 illustrated in FIGURE 3, may be provided, for improved air circulation.

Walls 12 support an open cage 18 having solid interior side walls 20, and an upper lip 22. Within cage 18 is an open grid 24 which serves as a support both for heating element 26, and as the support for heating stones, not illustrated in FIGURE 1, but shown at 28 in FIGURE 2.

As is illustrated more clearly in FIGURE 2 open cage 18 is supported by the top of outer walls 12 of the stove body, by lip 22.

It will be appreciated that when stones 28 are in position and heating element 26 is in use that stones 28 will become heated, and in addition, heated air will circulate through bottom holes 14, through the open grid 24, and stones 28, to the sauna room in which the stove 10 is situated.

In FIGURE 3 a modified version of the sauna stove is illustrated, wherein a sheet of expanded metal 30 rests on heating element 26, and stones 28 in turn are supported thereby. Expanded metal sheet 30 will still permit free air circulation, but will tend to reduce "hot spots" which might occur on heating element 26 due to irregularities in the shapes of stones 28 resting thereon, and, moreover, expanded metal sheet 30 evenly distributes the weight of stones 28 on the heating element 26.

The modification illustrated in FIGURE 4 comprises the provision of elevated strips on grid 24 whereby these will project above the heating element 26, to prevent the stones resting directly on the heating element at the same time permitting free air circulation.

The modification illustrated in FIGURE 5 comprises the positioning of heating element 26 below grid 24, again to prevent the occurrence of "hot spots" on the said element 26. In this embodiment element 26 is supported by any suitable means such as by lugs or clips 27 projecting from the interior of walls 12.

It has been found that a sauna stove constructed according to the foregoing disclosure results in efficient, rapid, heating of stones 28, and the desired dispersion of dry heat within a sauna room.

I claim:

1. In a sauna bath stove, the combination of an outer casing having an open top and a perimetric side wall, a stone-receiving cage removably positioned in the upper portion of said casing, said cage having an open top and a perimetric side wall spaced inwardly from the perimetric side wall of the casing, said cage also having an open grid floor, a heating element positioned on the open grid floor of said cage, and an expanded metal sheet substantially coextensive in area with said grid floor superposed on said heating element, the perimetric wall of said casing being formed with air circulating openings communicating with the interior of the casing below said cage and with the space between the perimetric walls of the cage and casing.

2. A sauna bath stove, comprising in combination, an outer casing having an open top and including a perimetric wall and a closed bottom, a stone-receiving cage removably positioned in the upper portion of said casing, said cage having an open top, a perimetric wall spaced inwardly from the perimetric wall of the casing, an open grid floor spaced upwardly from the closed bottom of the casing, and an outturned perimetric lip provided at the upper edge of the perimetric wall of the cage, said lip removably resting on the upper edge of the perimetric wall of the casing whereby to support the cage in position, a heating element positioned adjacent the open grid floor of said cage, the perimetric wall of said casing being provided with a lower set of air circulating openings communicating with the space between the casing bottom and the cage grid floor and with an upper set of air circulating openings communicating with the space between the perimetric walls of the casing and cage, said heating element resting on the grid floor of said cage, and an expanded metal sheet substantially coextensive in area with said grid floor superposed on said heating element.

References Cited

UNITED STATES PATENTS

| | | | |
|---|---|---|---|
| 2,654,018 | 9/1953 | Sandberg | 219—378 |
| 3,110,797 | 11/1963 | Vanne et al. | |
| 3,275,800 | 9/1966 | Kuoppamaki et al. | |
| 3,299,443 | 1/1967 | Ketola | 219—378 X |

FOREIGN PATENTS

| | | |
|---|---|---|
| 929,954 | 7/1947 | France. |
| 948,633 | 9/1956 | Germany. |
| 884,956 | 12/1961 | Great Britain. |
| 63,474 | 4/1941 | Norway. |
| 47,291 | 5/1918 | Sweden. |

ANTHONY BARTIS, *Primary Examiner.*